United States Patent
Barton-Sweeney et al.

(10) Patent No.: US 9,551,992 B1
(45) Date of Patent: Jan. 24, 2017

(54) FALL BACK TRAJECTORY SYSTEMS FOR AUTONOMOUS VEHICLES

(71) Applicant: Google Inc., Mountain View, CA (US)

(72) Inventors: Andrew Barton-Sweeney, Berkeley, CA (US); Daniel Trawick Egnor, Palo Alto, CA (US); Nathaniel Fairfield, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/991,150

(22) Filed: Jan. 8, 2016

(51) Int. Cl.
  *G05D 1/00* (2006.01)
  *G05D 1/02* (2006.01)

(52) U.S. Cl.
  CPC .......... *G05D 1/0212* (2013.01); *G05D 1/0088* (2013.01)

(58) Field of Classification Search
  None
  See application file for complete search history.

(56) References Cited

U.S. PATENT DOCUMENTS

| | | | |
|---|---|---|---|
| 6,442,456 B2 | 8/2002 | Burns et al. | |
| 8,433,470 B1* | 4/2013 | Szybalski | B62D 1/286 701/23 |
| 8,880,272 B1* | 11/2014 | Ferguson | G05D 1/0212 701/23 |
| 9,063,546 B2 | 6/2015 | Hauler et al. | |
| 9,120,485 B1* | 9/2015 | Dolgov | B60W 30/10 |
| 9,235,211 B2* | 1/2016 | Davidsson | B60W 50/14 |
| 9,405,293 B2* | 8/2016 | Meuleau | G05D 1/0212 |
| 2010/0106356 A1* | 4/2010 | Trepagnier | G01S 17/023 701/25 |
| 2012/0083959 A1* | 4/2012 | Dolgov | G05D 1/0214 701/23 |
| 2013/0197719 A1* | 8/2013 | Nagasawa | G05D 1/0027 701/2 |
| 2013/0304300 A1* | 11/2013 | Peake | B62D 15/025 701/23 |
| 2014/0114526 A1 | 4/2014 | Erb | |
| 2014/0358327 A1* | 12/2014 | Nordbruch | B60W 50/082 701/1 |
| 2015/0012166 A1* | 1/2015 | Hauler | G05D 1/0212 701/23 |

(Continued)

OTHER PUBLICATIONS

"Redundancy (engineering)", https://en.wikipedia.org/wiki/Redundancy_(engineering), retrieved from the internet on Jan. 8, 2016, 5 pgs.

(Continued)

*Primary Examiner* — Jonathan M Dager
(74) *Attorney, Agent, or Firm* — Lerner, David, Littenberg, Krumholz & Mentlik, LLP

(57) ABSTRACT

Aspects of the disclosure provide systems and methods for providing suggested locations for pick up and destination locations. Pick up locations may include locations where an autonomous vehicle can pick up a passenger, while destination locations may include locations where the vehicle can wait for an additional passenger, stop and wait for a passenger to perform some task and return to the vehicle, or for the vehicle to drop off a passenger. As such, a request for a vehicle may be received from a client computing device. The request may identify a first location. A set of one or more suggested locations may be selected by comparing the predetermined locations to the first location. The set may be provided to the client computing device.

20 Claims, 13 Drawing Sheets

(56) References Cited

U.S. PATENT DOCUMENTS

| | | | |
|---|---|---|---|
| 2015/0019042 A1* | 1/2015 | Poechmueller | B60W 50/0098 701/1 |
| 2015/0142244 A1* | 5/2015 | You | G05D 1/0061 701/23 |
| 2015/0246678 A1* | 9/2015 | Hauler | B62D 1/28 701/25 |
| 2016/0167519 A1* | 6/2016 | Luke | B60L 3/0015 701/22 |
| 2016/0200317 A1* | 7/2016 | Danzl | B60K 28/06 701/25 |

OTHER PUBLICATIONS

"Redundant System Basic Concepts", http://www.ni.com/white-paper/6874/en/ (Jan. 11, 2008), 5 pgs.

* cited by examiner

FALL BACK TRAJECTORY SYSTEMS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location. While doing so, safety of the passengers and the vehicle is an important consideration. Accordingly, often these vehicles have fallback systems which essentially cause the vehicle to apply the brakes as hard and as quickly as possible in an emergency.

BRIEF SUMMARY

One aspect of the disclosure provides a method of controlling a vehicle. The method includes generating, by a primary computing system, a nominal trajectory from a location for a vehicle in order to achieve a mission goal. The nominal trajectory is generated based on information received by the primary computing system from a perception system of the vehicle configured to detect objects in the vehicle's external environment. The method also includes generating, by the primary computing system, a fall back trajectory from the location for the vehicle in order to safely stop the vehicle. The fall back trajectory is generated based on the information received by the primary computing system from the perception system of the vehicle. The nominal trajectory and the fall back trajectory are identical between the location and a divergent point and where the nominal trajectory and the fall back trajectory diverge after the divergent point. The method also includes sending, by the primary computing system, the fall back trajectory to a secondary computing system; receiving, by the secondary computing system, the fall back trajectory; controlling, by the secondary computing system, the vehicle according to the fall back trajectory; waiting, by the secondary computing system, for an updated trajectory from the primary computing system while controlling the vehicle according to the fall back trajectory; and when the vehicle reaches a threshold point on the fall back trajectory and an updated trajectory has not yet been received by the secondary computing system, continuing to control the vehicle, by the secondary computing system, according to the fall back trajectory in order to safely stop the vehicle.

In one example, the method also includes, when an updated trajectory is received after the threshold point is reached, ignoring, by the secondary computing system the updated trajectory. In another example, the method also includes receiving, by the secondary computing system, after the threshold point is reached, data from a sensor indicating that an object is detected by the sensor; and in response to receiving the data from the sensor, applying, by the secondary computing system, the brakes of the vehicle in order to stop the vehicle immediately. In this example, the sensor is not part of the perception system and is a dedicated sensor of the secondary computing system. In another example, the divergent location corresponds to a time along the fall back trajectory during which the primary computing system should send an updated fall back trajectory during normal operation of the primary computing system. In another example, the method also includes prior to receiving the fall back trajectory, receiving, by the secondary computing system from the primary computing system, a first fall back trajectory having a first divergent location where the first fall back trajectory diverges from a first nominal trajectory generated by the primary computing system; controlling, by the secondary computing system, the vehicle according to the first fall back trajectory; and prior to reaching the first divergent location, receiving, by the secondary computing system the fall back trajectory as an updated trajectory. In this example, the method also includes replacing, by the secondary computing system, the nominal trajectory with the updated trajectory in order to control the vehicle according to the fall back trajectory. In another example, the threshold point corresponds to a physical location of the vehicle that is a predetermined threshold distance from the location of the vehicle when the fall back trajectory is received. In another example, the threshold point corresponds to a point in time that is a predetermined threshold amount of time from the time when the fall back trajectory is received by the secondary computing system. In another example, the threshold point corresponds to a point of divergence between the nominal trajectory and the fall back trajectory.

Another aspect of the disclosure provides a system for controlling a vehicle. The system includes a primary computing system having one or more processors. The one or more processors of the primary computing system are configured to generate a nominal trajectory from a location for a vehicle in order to achieve a mission goa. The nominal trajectory is generated based on information received by the primary computing system from a perception system of the vehicle configured to detect objects in the vehicle's external environment. The one or more processors of the primary computing systems are also configured to generate a fall back trajectory from the location for the vehicle in order to safely stop the vehicle. The fall back trajectory is generated based on the information received by the primary computing system from the perception system of the vehicle. The nominal trajectory and the fall back trajectory are identical between the location and a divergent location and where the nominal trajectory and the fall back trajectory diverge after the divergent location. The one or more processors are also configured to send the fall back trajectory to a secondary computing system. The system also includes the secondary computing system having one or more processors. The one or more processors of the secondary computing system are configured to receive the fall back trajectory; control the vehicle according to the fall back trajectory; wait for an updated trajectory from the primary computing system while controlling the vehicle; and when the vehicle reaches a threshold point on the fall back trajectory and an updated trajectory has not yet been received by the secondary computing system, continue to control the vehicle according to the fall back trajectory in order to safely stop the vehicle.

In one example, the one or more processors of the secondary computing system are also configured to, when an updated trajectory is received after the threshold point is reached, ignore the updated trajectory. In another example, the one or more processors of the secondary computing system are also configured to receiving after the threshold value is reached, data from a sensor indicating that an object is detected by the sensor; and in response to receiving the data from the sensor, applying the brakes of the vehicle in order to stop the vehicle immediately. In this example, the system also includes the sensor, and the sensor is not part of the perception system and is a dedicated sensor of the secondary computing system. In another example, the divergent location corresponds to a time along the fall back trajectory during which the primary computing system should send an updated fall back trajectory during normal operation of the primary computing system. In another example, the one or more processors of the secondary computing system are further configured to, prior to receiving the fall back trajectory, receive, from the primary computing system, a first fall back trajectory having a first divergent location where the first fall back trajectory diverges from a first nominal trajectory generated by the primary computing system; control the vehicle according to the first fall back trajectory; and prior to reaching the first divergent location, receive the fall back trajectory as an updated trajectory. In this example, the one or more processors of the secondary computing system are further configured to replace the nominal trajectory with the updated trajectory in order to control the vehicle according to the fall back trajectory. In another example, the system also includes the vehicle and the perception system.

A further aspect of the disclosure provides a method. The method includes receiving, by one or more processors of the secondary computing system from the primary computing system, a fall back trajectory from the location for the vehicle in order to safely stop the vehicle. A portion of the fall back trajectory from the location of the vehicle to a divergent location is identical to a portion of a nominal trajectory from the location of the vehicle to the divergent location. The nominal trajectory allows the vehicle to achieve a mission goal, and the nominal trajectory and the fall back trajectory diverge after the divergent location. The method also includes controlling, by the one or more processors of the secondary computing system, the vehicle according to the portion of the fall back trajectory in order to achieve the mission goal; waiting, by the one or more processors of the secondary computing system, for an updated trajectory from the primary computing system while controlling the vehicle; and when the vehicle reaches a threshold point on the fall back trajectory and an updated trajectory has not yet been received by the one or more processors of the secondary computing system, continuing, by the one or more processors of the secondary computing system, to control the vehicle according to the fall back trajectory in order to safely stop the vehicle.

In one example, the method also includes, when an updated trajectory is received after the threshold point is reached, ignoring, by the one or more processors of the secondary computing system, the updated trajectory.

DETAILED DESCRIPTION

Overview

Figure 1:
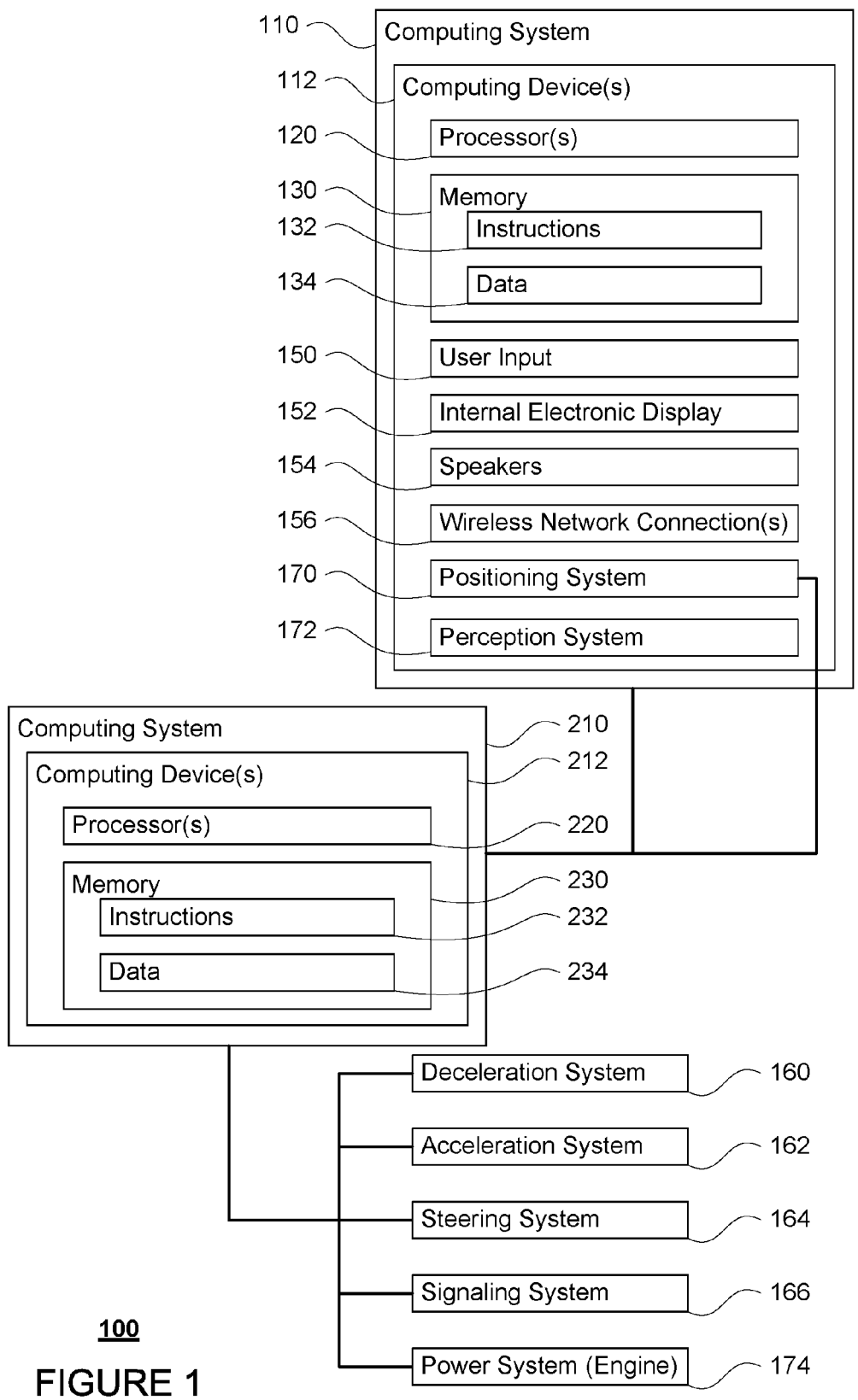
FIG. 1 is a functional diagram of an example vehicle in accordance with aspects of the disclosure.

Aspects of the technology relate to autonomous vehicles which rely on secondary computing system in the event of a failure of a primary computing system. These vehicles can be highly complex and require a significant amount of software and sensors to function safely. In the event of a failure of these systems, the vehicle must be able to come to a safe position without human intervention.

In order to facilitate this, the vehicle may have primary and secondary computing systems. The primary computing system may be fairly complex, and include sophisticated perception and planning systems. The perception system may include a plurality of sensors configured to detect and identify objects in the vehicle's environment. The planning system may use data from the perception system in conjunction with detailed map information in order to generate a future path or trajectory for the vehicle to achieve a mission goal, for example, by reaching a particular destination location.

The secondary computing system may be somewhat less complex. As an example, the secondary computing system may be sophisticated enough to maneuver the vehicle based on information received from the primary computing system, but may lack the sophisticated perception and planning systems of the primary computing system. In this regard, the secondary computing system may communicate and control the heading and speed of the vehicle. In order to do so, the secondary computing system may receive or access location information from the primary computing system and information from other systems related to the status of the vehicle, such as those which indicate the position of the wheels, what the brakes are doing, etc. This enables the secondary computing system to follow a particular trajectory as discussed below.

The primary and secondary computing systems may work in conjunction in order to achieve the mission goal. For example, the primary computing system may provide the secondary computing system with a trajectory for the vehicle. In response, the secondary computing system may maneuver the vehicle according to the future path.

However, the trajectory generated by the primary computing system and provided to the secondary computing system may be a fall back trajectory. In this regard, the fall back trajectory may actually include the vehicle pulling over to a safe position and stopping the vehicle.

At the same time that the primary computing system generates the fall back trajectory, the primary computing system may also generate the nominal trajectory that moves the vehicle towards the mission goal. For some brief period, the fall back and the nominal trajectory may be identical. After this brief period, the trajectories may quickly diverge from one another.

The brief period of overlap may be selected based upon when the secondary computing system would expect to receive an update from the primary computing system and also how quickly the vehicle can actually make a real change to its heading or speed. For example, where the primary computing system may send trajectories to the secondary computing system at some predetermined interval, the nominal and fall back trajectories should correspond for at least this predetermined interval or even double this predetermined interval. By doing so, the secondary computing system may control the vehicle according to the nominal trajectory until at least some amount of time has passed where the secondary computing system would expect to receive an updated trajectory from the primary computing system. When an updated trajectory is received, the secondary computing system would then control the vehicle according to the updated trajectory until a new updated trajectory is received, and so on until the mission goal is achieved.

However, when the secondary computing system has not received an updated trajectory after the vehicle has reached a particular point along the fall back trajectory (for example in time or space), the secondary computing system would continue to control the vehicle according to the fall back trajectory. This threshold point may correspond to a point in time or space on the fall back trajectory where it would begin to diverge from the nominal trajectory. Of course, the threshold point may be sometime before or even a short time after the point of divergence between the fall back and nominal trajectories. In this regard, even when the primary computing system has failed, the secondary computing system would not need to switch to a new trajectory, but would simply continue controlling the vehicle using the last received trajectory. As this trajectory is a fall back trajectory, the secondary computing system would therefore maneuver the vehicle to stop safely.

In addition, after the threshold point has been passed, if an update is received, the secondary computing system can be configured not to trust this updated trajectory and simply ignore it. This prevents the secondary computing system from acting on bad data received from a failing primary computing system or from attempting to follow an unfeasible or unsafe trajectory where the vehicle has already moved off of the nominal trajectory, such as when the vehicle is beginning to pull over according to the fall back trajectory.

In some examples, the secondary computing system may include a rudimentary perception system. This perception system may include one of the sensors of the primary computing system's perception system or a dedicated sensor for the secondary computing system. For instance, a forward radar could be used to monitor objects directly in front of the vehicle. However, to keep the secondary computing system as simple as possible, this sensor may simply be used by the vehicle simply as a last resort option to apply the brakes as much as possible where an object is detected within a certain distance of the vehicle. However, in order to avoid this action when not necessary, the sensor may be configured to filter many different types of objects, for example, based on distance and speed of the object and/or vehicle.

Using the features described herein, the transition from achieving a mission goal to safely navigating the vehicle to a stop in an appropriate location when the primary computing system has failed is entirely seamless. Because only one trajectory is sent, the systems are dramatically simplified. There is no switching between trajectories or need for the secondary computing system to be complex enough to handle divergences between trajectories where a switch is made. This also avoids the need to have both the primary and secondary computing systems have separate control interfaces for controlling the speed and heading of the vehicle.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, including a primary computing system 110 and a secondary computing system 210. Primary computing system includes a computing device, such as computing device 112 containing one or more processors 120, memory 130 and other components typically present in general purpose computing devices. Similarly, secondary computing system includes computing device 212 containing one or more processors 220, memory 230, and other components typically present in a general purpose computer.

The memories 130, 230 stores information accessible by the one or more processors including instructions 132, 232 and data 134, 234 that may be executed or otherwise used by the processors 120, 220. The memories 130, 230 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132, 232 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134, 234 may be retrieved, stored or modified by the processors 120, 220 in accordance with the instructions 132, 232. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120, 220 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 112 (and computing device 212) as being within the same block, the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory 130 (or 230) may be a hard drive or other storage media located in a housing different from that of computing device 112 (or 212). Accordingly, references to a processor or computing device will be understood to include references to a collection of processors or computing devices or memories that may or may not operate in parallel.

Computing device 112 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

In one example, computing system 110 may be part of an autonomous driving computing system incorporated into vehicle 100. As such, the computing system 110, by way of computing device 112, may be or include a planning system 168 that generates plans or trajectories to navigate the vehicle to a location or around objects. In order to do so, computing system 110 may include a positioning system 170 (for determining the position of the vehicle) and a perception system 172 (for detecting objects in the vehicle's environment). Again, although these systems are shown as being incorporated into computing system 110, in actuality, these systems may distinct from computing system 110. For instance, the positioning system may be entirely distinct from the computing system 110. In this case, this may allow the secondary computing system to use the output of the positioning system to follow a trajectory as discussed below.

By way of example, computing device 112 may determine how to navigate the vehicle to a destination location completely autonomously using data from detailed map information. In this regard, data 132 may store map information, e.g., highly detailed maps identifying the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
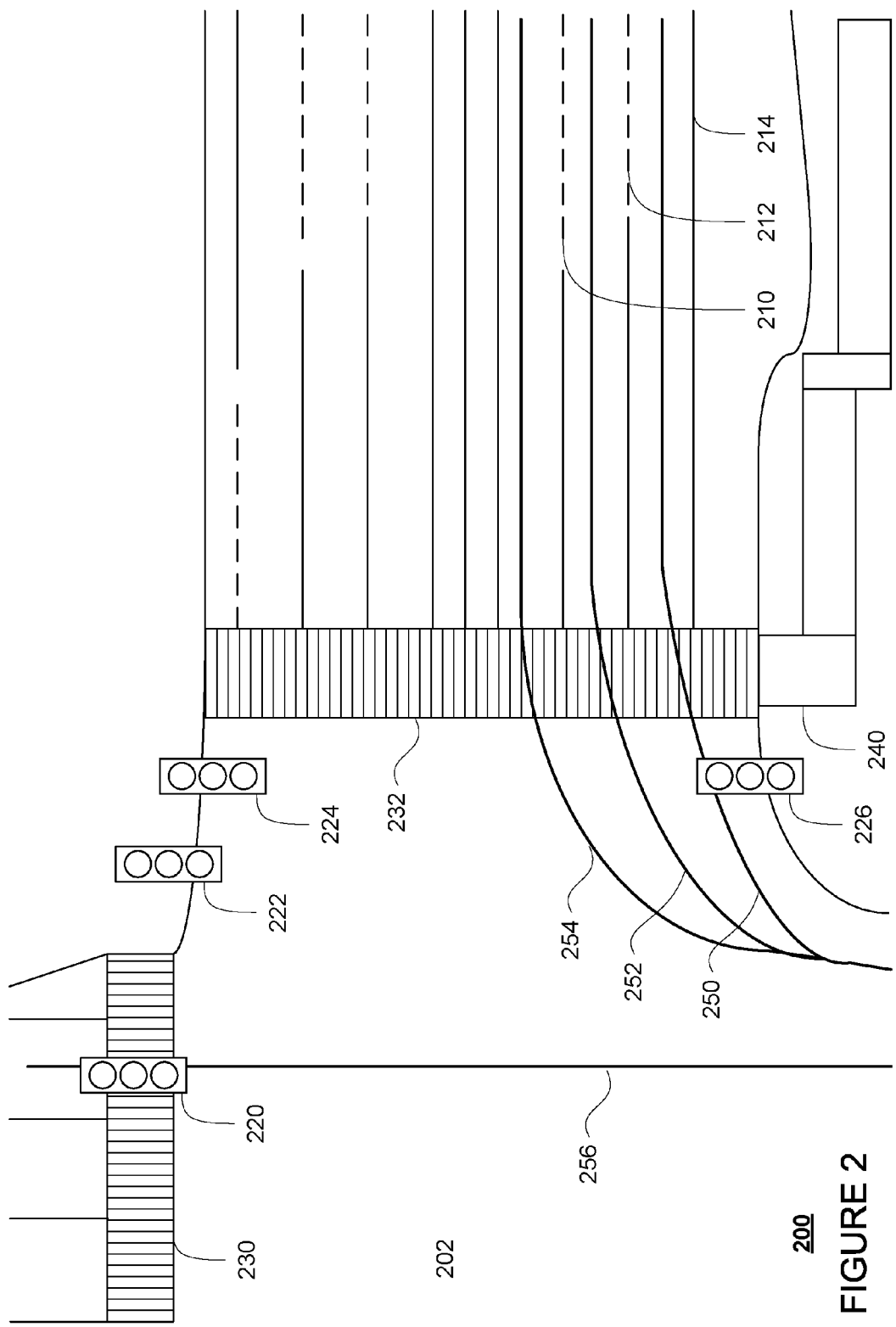
FIG. 2 is an example representation of detailed map information in accordance with aspects of the disclosure.
Figure 3A:
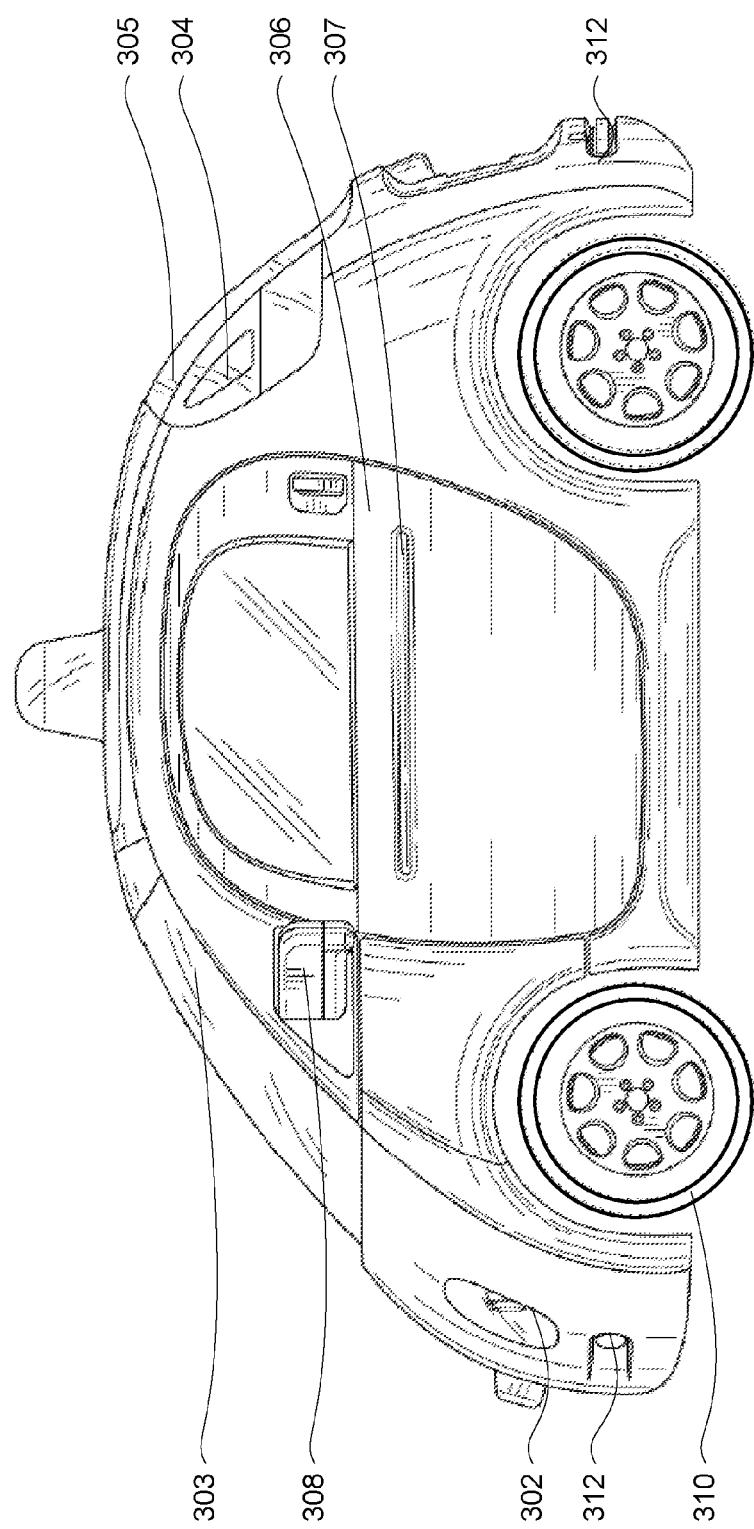
FIGS. 3A-3D are example external views of a vehicle in accordance with aspects of the disclosure.
Figure 3C:
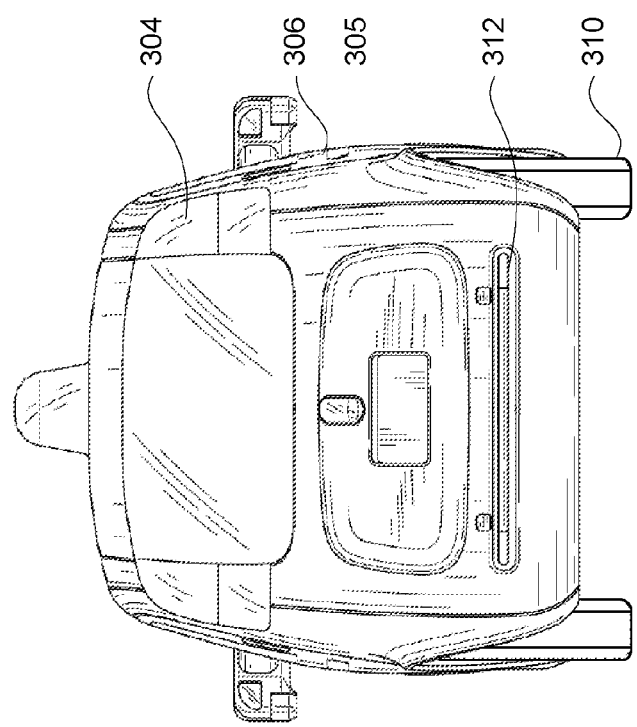
Figure 3B:
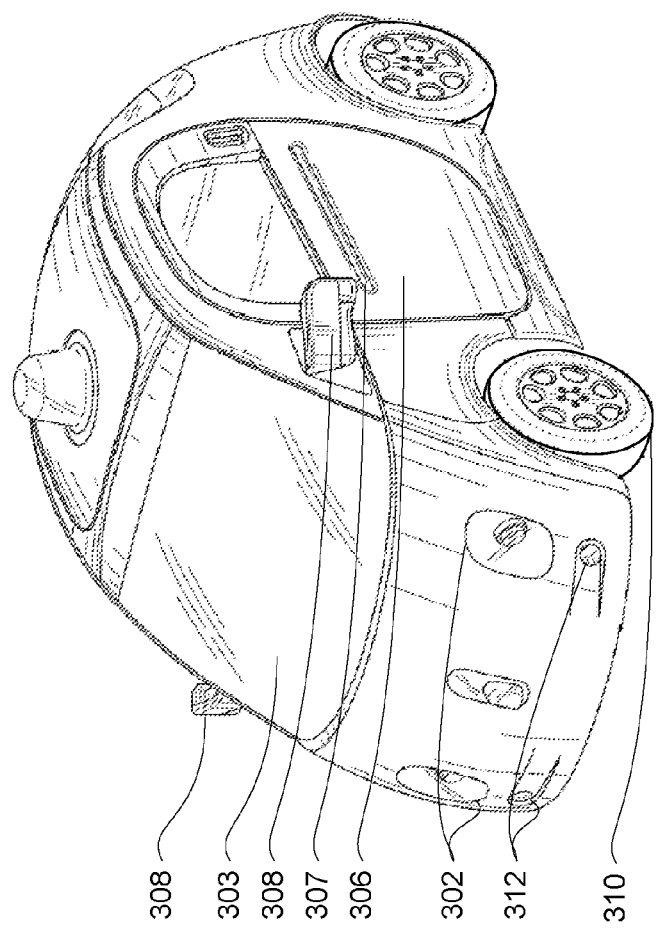
Figure 3D:
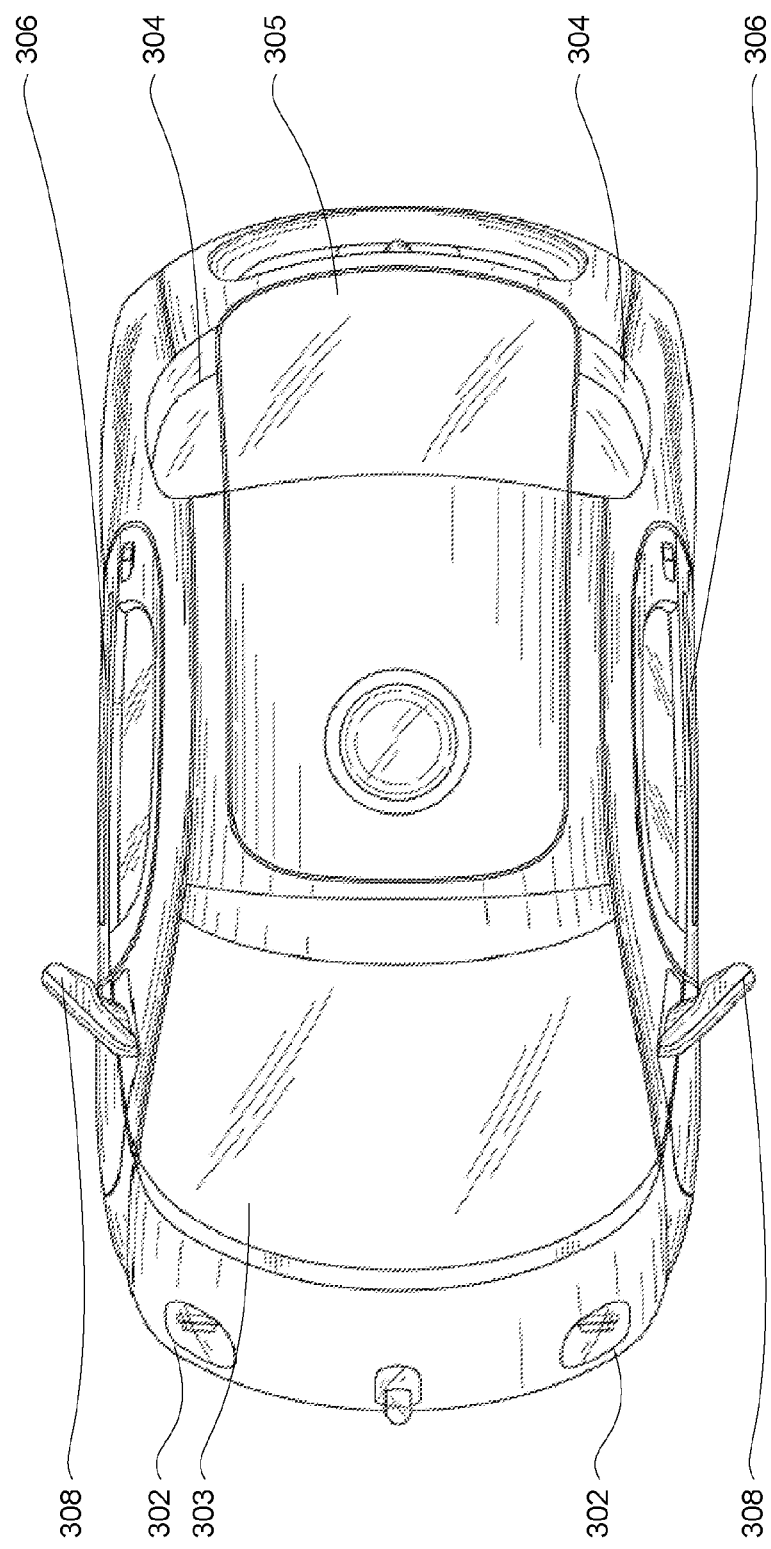

FIG. 2 is an example of detailed map information 200 for a section of roadway including an intersection 202. In this example, the detailed map information 200 includes information identifying the shape, location, and other characteristics of lane lines 210, 212, 214, traffic signal lights 220, 222, 224, 226, crosswalks 230, 232, and sidewalks 240. Each lane may be associated with a rail 250, 252, 254, 256 which indicates the direction in which a vehicle should generally travel in the respective lane. For example, a vehicle may follow rail 252 when driving in the lane between lane lines 210 and 212.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The computing device 112 may use data from the positioning system 170, perception system 172, and the detailed map information in order to generate a future path or trajectory for the vehicle to achieve a mission goal, for example, by reaching a particular destination location. These trajectories may include specific locations or waypoints that should be reached by the vehicle at specific times into the future, but may include a set of waypoints without times, a set of directions (turn left, turn right, go straight, etc.), a set of images depicting what the system should see, etc. Together, these locations form a future trajectory for the vehicle. In addition to the trajectory, the computing device 112 may generate corresponding instructions for controlling various systems of the vehicle in order to maneuver the vehicle according to the trajectory, or rather in order to reach the specific locations at the specific times in the future. The computing system 110 may then send the trajectory and corresponding instructions to computing system 210.

In addition, computing system 210 may also be a part of the autonomous driving computing system incorporated into vehicle 100, but may also be somewhat less complex than computing system 110. As an example, the computing system 210 may be sophisticated enough to maneuver the vehicle based on trajectories and corresponding instructions received from the computing system 110, but may lack the sophisticated perception and planning systems of the computing system 110. In this regard, the computing system 210 may communicate with various other systems of the vehicle in order to control the heading and speed of the vehicle. In order to do so, the secondary computing system may receive or access location information from the positioning system 170 of computing system 110 as well as information from other systems related to the status of the vehicle, such as those which indicate the position of the wheels, what the brakes are doing, etc. This enables the computing system 210 to follow a particular trajectory as discussed below.

For example, computing device 210, by way of computing device 212, may send to and receive information from a deceleration system 160 (for controlling braking of the vehicle or in some cases may simply include the brakes of the vehicle), acceleration system 162 (for controlling acceleration of the vehicle or in some cases may simply include controlling power to the engine), steering system 164 (for controlling the orientation of the wheels and direction of the vehicle), signaling system 166 (for controlling turn signals), and power system 174 (for example, a battery and/or gas or diesel powered engine) in order to control the movement, speed, etc. of vehicle 100 in accordance with the instructions 234 of memory 230 as well as other received input autonomously. In this regard, the computing system 210 can control the vehicle without the need continuous or periodic input from a passenger of the vehicle. Again, although these systems are shown as external to computing device 210, in actuality, these systems may also be incorporated into computing device 210, again as an autonomous driving computing system for controlling vehicle 100.

The computing device 210 may control the direction and speed of the vehicle by controlling various components according to the corresponding instructions of a given trajectory received from the computing system 110. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 212 may also control the drivetrain of the vehicle in order to maneuver the vehicle autonomously. As an example, computing device 212 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 212 in order to signal the vehicle's intent to other drivers or vehicles, for example, by lighting turn signals or brake lights when needed.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Figure 4:
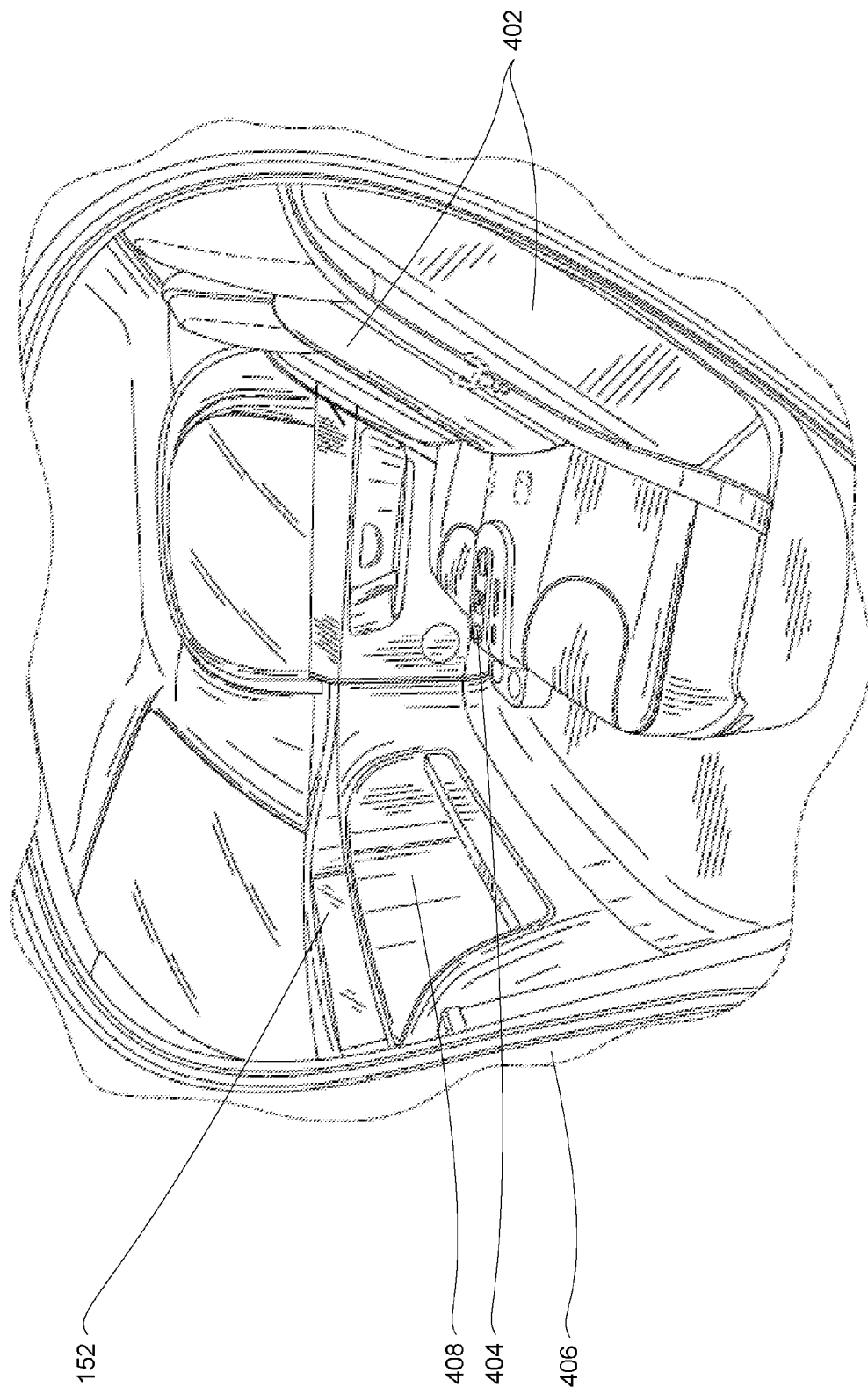
FIG. 4 is an example internal view of a vehicle in accordance with aspects of the disclosure.

FIG. 4 is an example internal view of vehicle 100 through the opening of door 306. In this example, there are two seats 402 for passengers with a console 404 between them. Directly in ahead of the seats 402 is a dashboard configuration 406 having a storage bin area 408 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 404, and, if available, wireless network connections 156. In this regard, internal electronic display 152 may merely provide information to the passenger and need not include a touch screen or other interface for user input. In other embodiments, the internal electronic display 152 may include a touch screen or other user input device for entering information by a passenger such as a destination, etc. Similarly, the vehicle may include a steering, acceleration and braking input that a passenger can use to control the vehicle in a manual or semi-autonomous driving mode.

Figure 5:
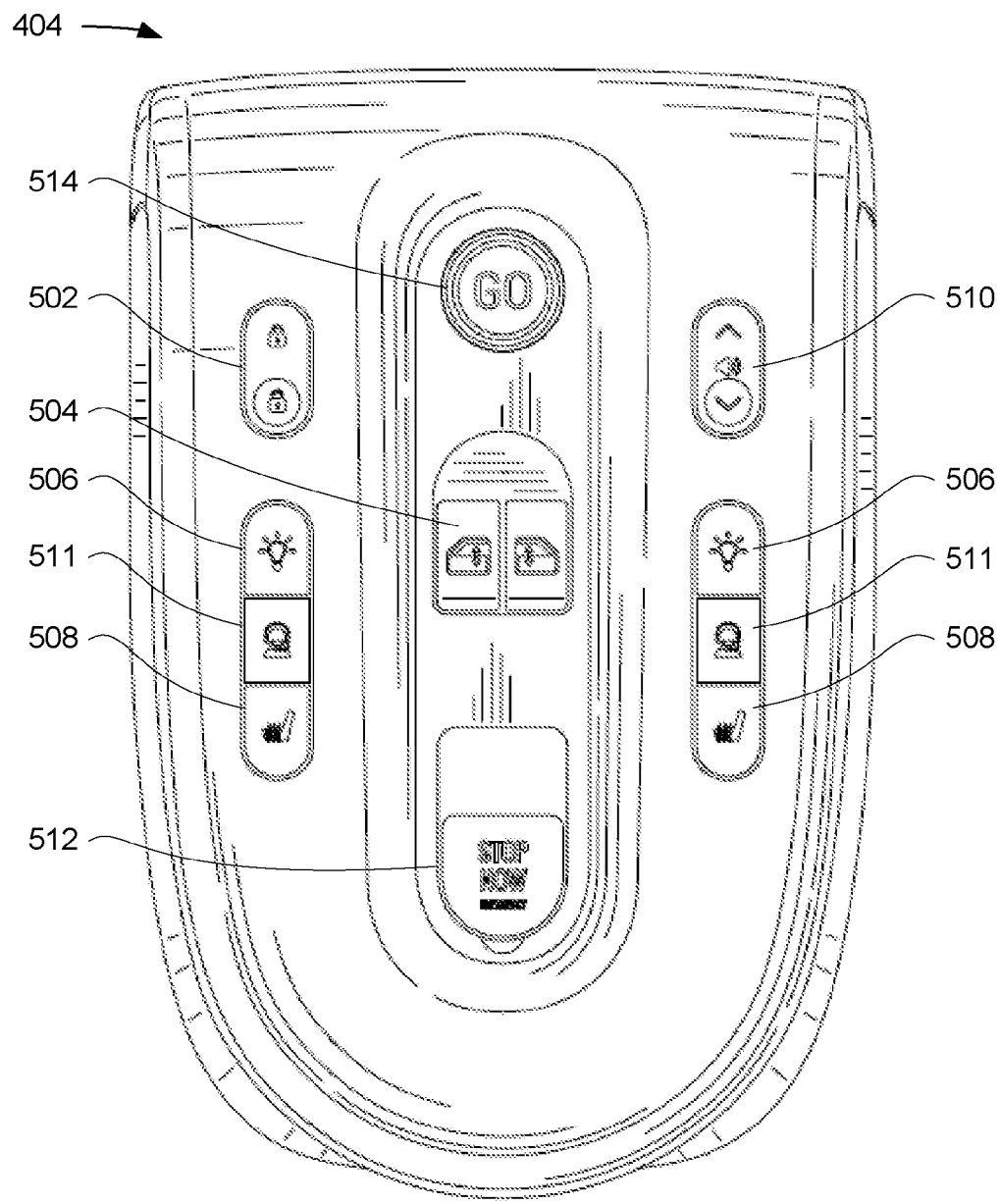
FIG. 5 is an example of a console of a vehicle in accordance with aspects of the disclosure.

FIG. 5 is a top down view of the console 404. Console 404 includes various buttons for controlling features of vehicle 100. For example, console 404 includes buttons that may be found in a typical vehicle such as buttons 502 for locking and unlocking the doors 306, buttons 504 for raising or lowering the windows of doors 306, buttons 506 for turning on internal lights of the vehicle, buttons 508 for controlling a heating function of seats 402, as well as buttons 510 for controlling the volume of speakers 154.

In addition, console 404 also includes buttons 511 for initiating communication with a remote concierge via a wireless network connection if available. Buttons 512 and 514 may also be a part of user input 150 and in this regard, allow a passenger to communicate with computer 110, for example, to initiate or end a trip in the vehicle. In this regard, button 512 may act as an emergency stopping button that, when pushed, causes vehicle 100 to stop in a short amount of time. Because the passenger does not have direct control of the acceleration or deceleration of vehicle 100 by way of a gas or brake pedal, button 512 may be an emergency stop button that is critical to allowing a passenger to feel safe and act quickly in case of an immediate emergency.

Button 514 may be a multi-function button. For example, button 514 may have three different states. In the first state, button 514 may be inactive, that is, if pressed, the vehicle's computer 110 would not respond by taking any particular action with regard to controlling the movement of the vehicle. In the second state, when the vehicle is ready to begin a trip, the button 514 may change to a "GO" button which a passenger uses to initiate a trip to a destination or drop off location. Once vehicle 100 is moving, button 514 may change to a third state, where the button 514 is a "PULL OVER" button which a passenger users to initiate a non-emergency stop. In this regard, computer 110 may respond by determining a reasonable place to pull the vehicle over, rather than coming to a more sudden stop as with the emergency stop button 512.

Thus, passenger communication with computer 110 for navigation purposes may be limited to button 514, emergency stopping button 512, a short range wireless communication system (such as Bluetooth LE) with the passenger's client computing device, and by sending information from the passenger's client computing device to a remote server which then relays that information to the vehicle's computer. In some examples, a passenger may provide information to the vehicle's computer 110 via voice commands though the microphone as discussed above. In addition, however, the passenger may communicate with the concierge via a phone call, an application on the passenger's client computing device, a microphone, and/or the concierge button 511 and in turn, the concierge may provide instructions control certain aspects of a vehicle via a concierge work station.

Figure 6:
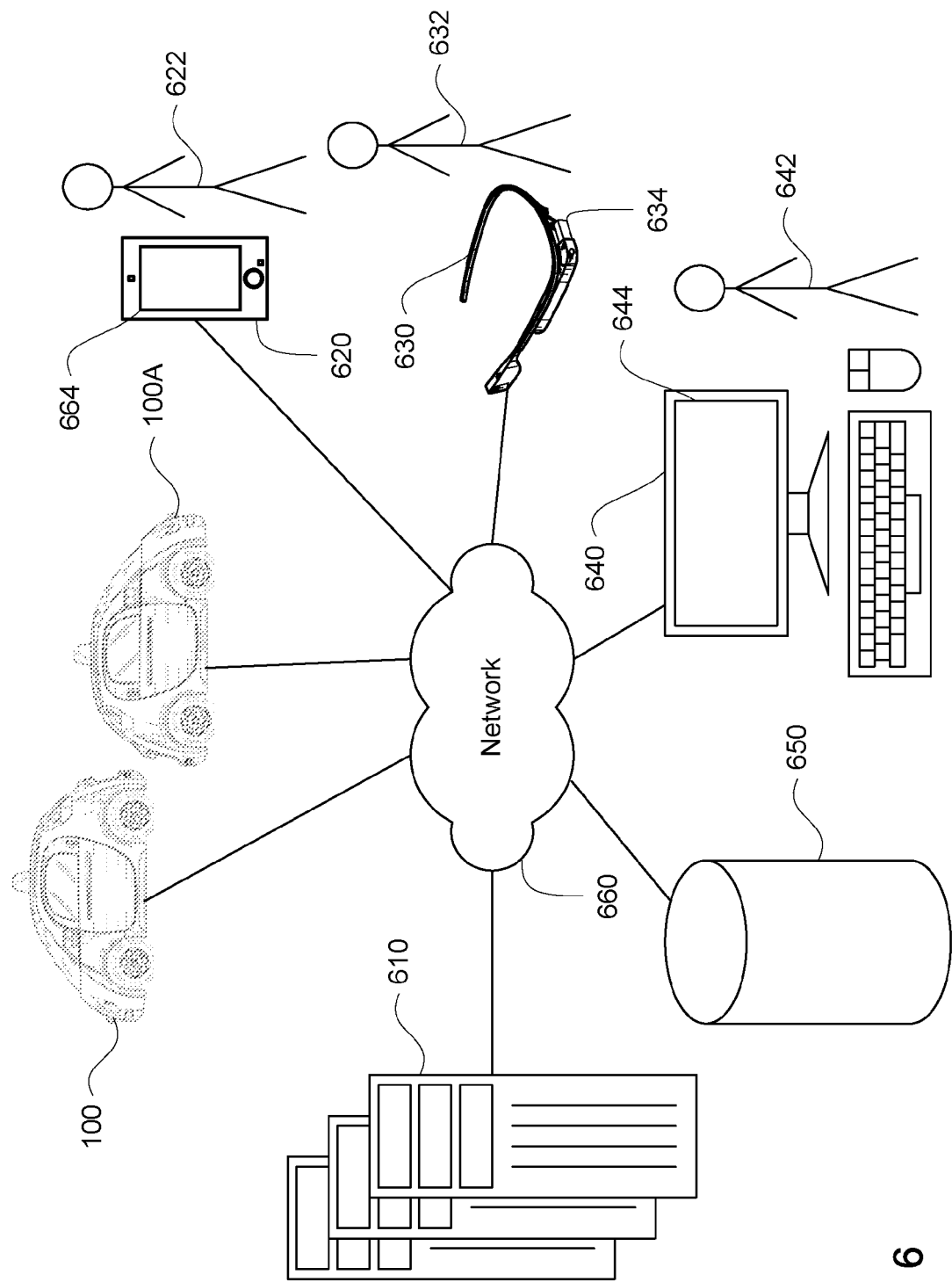
FIG. 6 is a functional diagram of an example system in accordance with an exemplary embodiment.
Figure 7:
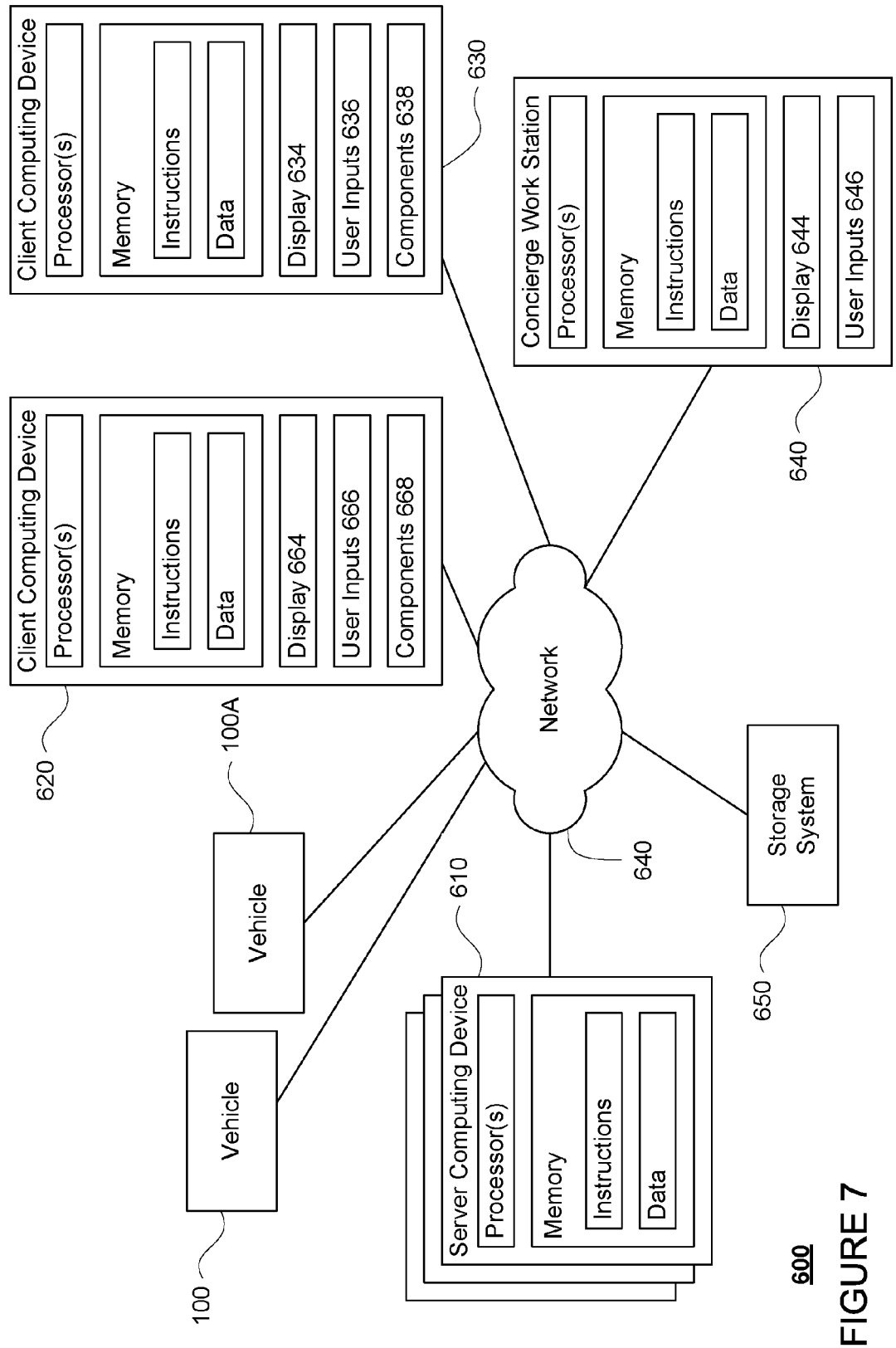
FIG. 7 is a pictorial diagram of the system of FIG. 6 in accordance with aspects of the disclosure.

The one or more computing devices 110 of vehicle 100 may also receive or transfer information to and from other computing devices. FIGS. 6 and 7 are pictorial and functional diagrams, respectively, of an example system 600 that includes a plurality of computing devices 610, 620, 630, 640 and a storage system 650 connected via a network 660. System 600 also includes vehicle 100, and vehicle 100A which may be configured similarly to vehicle 100. Although only a few vehicles and computing devices are depicted for simplicity, a typical system may include significantly more.

As shown in FIG. 6, each of computing devices 610, 620, 630, 640 may include one or more processors, memory, data and instructions. Such processors, memories, data and instructions may be configured similarly to one or more processors 120, memory 130, data 132, and instructions 134 of computing device 110.

The network 660, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with one or more computing devices 110 of vehicle 100 or a similar computing device of vehicle 100A as well as client computing devices 620, 630, 640 via the network 660. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 610 may use network 660 to transmit and present information to a user, such as user 622, 632, 642 on a display, such as displays 624, 634, 644 of computing devices 620, 630, 640. In this regard, computing devices 620, 630, 640 may be considered client computing devices.

As shown in FIG. 7, each client computing device 620, 630, 640 may be a personal computing device intended for use by a user 622, 632, 642, and have all of the components normally used in connection with a personal computing device including a one or more processors (e.g., a central processing unit (CPU)), memory (e.g., RAM and internal hard drives) storing data and instructions, a display such as displays 624, 634, 644 (e.g., a monitor having a screen, a touch-screen, a projector, a television, or other device that is operable to display information), and user input devices 626, 636, 646 (e.g., a mouse, keyboard, touch-screen or microphone). The client computing devices may also include a camera for recording video streams, speakers, a network interface device, and all of the components used for connecting these elements to one another.

Although the client computing devices 620, 630, and 640 may each comprise a full-sized personal computing device, they may alternatively comprise mobile computing devices capable of wirelessly exchanging data with a server over a network such as the Internet. By way of example only, client computing device 620 may be a mobile phone or a device such as a wireless-enabled PDA, a tablet PC, a wearable computing device or system, or a netbook that is capable of obtaining information via the Internet or other networks. In another example, client computing device 630 may be a wearable computing system, shown as a head-mounted computing system in FIG. 7. As an example the user may input information using a small keyboard, a keypad, microphone, using visual signals with a camera, or a touch screen.

In some examples, client computing device 640 may be concierge work station used by an administrator to provide concierge services to users such as users 622 and 632. For example, a concierge 642 may use the concierge work station 640 to communicate via a telephone call or audio connection with users through their respective client computing devices or vehicles 100 or 100A in order to ensure the safe operation of vehicles 100 and 100A and the safety of the users as described in further detail below. Although only a single concierge work station 640 is shown in FIGS. 6 and 7, any number of such work stations may be included in a typical system.

Storage system 650 may store various types of information as described in more detail below. This information may be retrieved or otherwise accessed by a server computing device, such as one or more server computing devices 610, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 650 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. As with memory 130, storage system 250 can be of any type of computerized storage capable of storing information accessible by the server computing devices 610, such as a hard-drive, memory card, ROM, RAM, DVD, CD-ROM, write-capable, and read-only memories. In addition, storage system 650 may include a distributed storage system where data is stored on a plurality of different storage devices which may be physically located at the same or different geographic locations. Storage system 650 may be connected to the computing devices via the network 660 as shown in FIG. 6 and/or may be directly connected to or incorporated into any of the computing devices 110, 610, 620, 630, 640, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 622 and 632 may download the application via a link in an email, directly from a website, or an application store to client computing devices 620 and 630. For example, client computing device may transmit a request for the application over the network, for example, to one or more server computing devices 610, and in response, receive the application. The application may be installed locally at the client computing device.

The user may then use his or her client computing device to access the application and request a vehicle. As an example, a user such as user 632 may use client computing device 630 to send a request to one or more server computing devices 610 for a vehicle. The request may include information identifying a pickup location or area and/or a destination location or area. As an example, such location may be identified by street addresses, location coordinates, points of interest, etc. In response the one or more server computing devices 610 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. As the vehicle approaches the user's client device, the vehicle's computer may authenticate the user's client device and also the user. When the user is authenticated, the vehicle's computing devices may automatically unlock the vehicle's doors and allow the user to enter the vehicle. The vehicle's one or more computing devices 110 may also display a welcome screen on the internal electronic display 152. This welcome screen may provide instructions to the user (now a passenger) on how to use the vehicle. For example, the instructions may include requesting that the passenger shut the doors 306 if needed and buckle his or her seatbelt. Sensors associated with the seats, doors, and seatbelts may be used to determine if the passenger has complied. Once the passenger has complied with the instructions, he or she may press or otherwise activate button 514. In response, the computer 110 may initiate the necessary systems to control the vehicle autonomously along a route to the destination location.

While the vehicle is being driven autonomously by the autonomous driving system, the computing systems 110 and 210 may work in conjunction in order to achieve a mission goal, such as maneuvering to a pickup location to pickup a passenger, maneuvering to a destination to drop off a passenger, etc. For example, as noted above the computing system 110 may generate a trajectory and corresponding instructions for following the trajectory. The computing system 110 may then send this information to the computing system 210. In response, the computing system 210 may maneuver the vehicle according to the trajectory and corresponding instructions.

Figure 8:
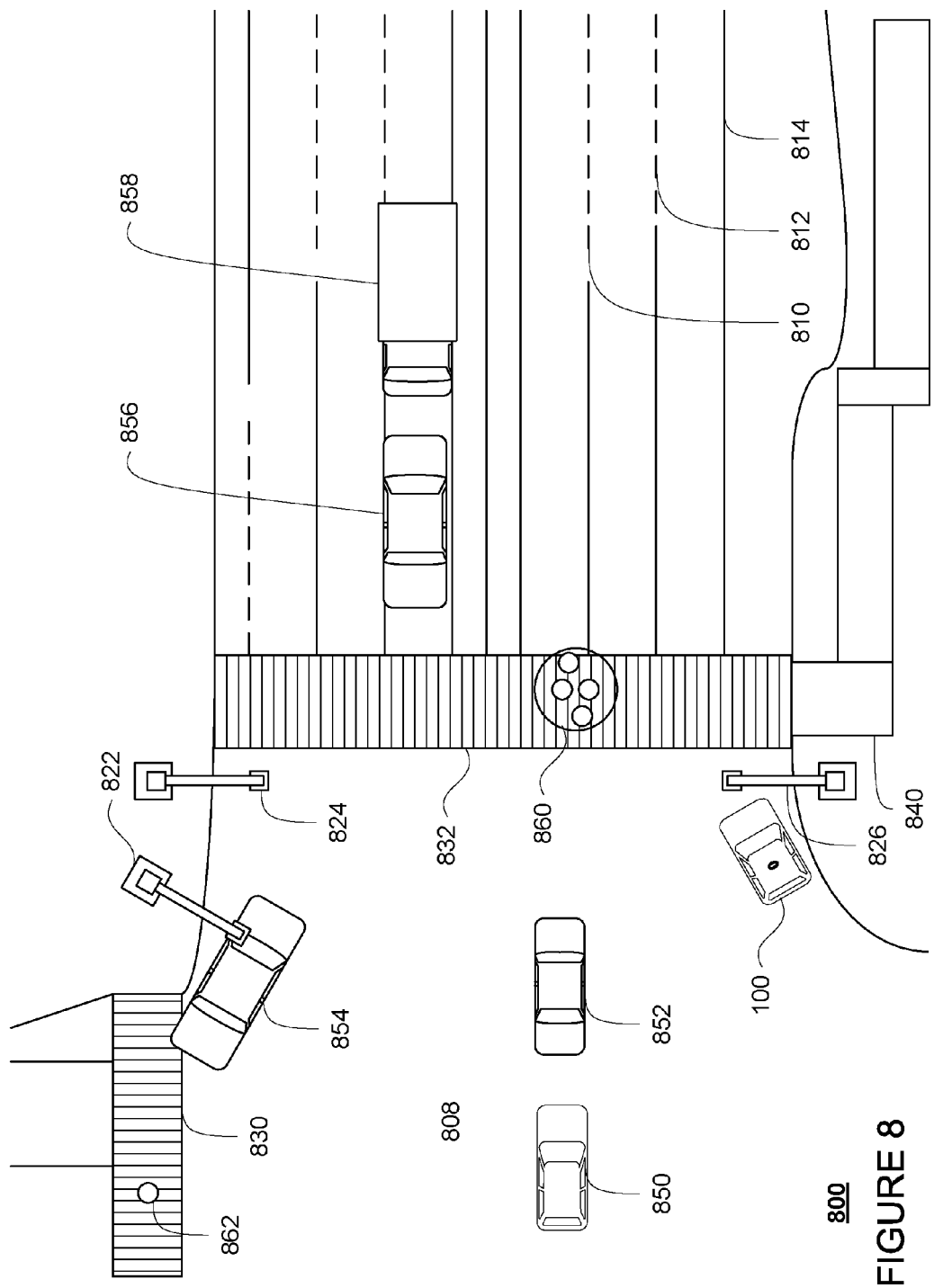
FIG. 8 is an example bird's eye view of an intersection in accordance with aspects of the disclosure.

For example, FIG. 8 depicts a section of roadway 800 including an intersection 802 on which the vehicle 110 is currently being maneuvered autonomously by the autonomous driving system. Vehicle 100 is approaching intersection 802 and may be controlled, for example by one or more one or more computing devices 110 in an autonomous driving mode as described above. In this example, intersection 802 corresponds to the intersection 202 of the detailed map information 200, and vehicle is generally following rail 250 in order to follow a route towards the destination (both not shown in FIG. 8). In this example, lane lines 810, 812, and 814 correspond to the shape, location, and other characteristics of lane lines 210, 212, and 214, respectively. Similarly crosswalks 830 and 832 correspond to the shape, location, and other characteristics of crosswalks 230 and 232, respectively, sidewalks 840 correspond to sidewalks 240, and traffic signal lights 822, 824, and 826 correspond to the shape, location, and other characteristics of traffic signal lights 222, 224 and 226.

The vehicle's perception system 172 may continuously detect and identify objects in the vehicle's environment. For instance, the vehicle's computing devices 110 may detect and identify lane lines 810, 812, and 814, crosswalks 830 and 832, sidewalks 840, and traffic signal lights 822, 824, and 826. In addition to these "static" features, the vehicle's perception system may also detect, track, and identify various other objects such as vehicles 850-858 and pedestrians 860, 862. In other words, the perception system 172 may determine the general shape and orientation as well as speed of these objects by observing these objects over a brief period of time.

This information, along with position information identifying the current geographic location of the vehicle from the positioning system 170, may be fed to the computing device 112 of the computing system 110 in order to generate trajectories for the vehicle. As noted above, in order to do so, the computing device 112 may also retrieve relevant detailed map information. From a given geographic location of the vehicle, the computing system 110 may generating two different trajectories, only one of which is actually sent to the computing system 210 to be acted upon. The first trajectory may be a nominal trajectory that enables the vehicle to continue towards achieving the mission goal, while the second trajectory may be a fall back trajectory. For safety, only the second, fallback trajectory and corresponding instructions may be sent to the computing system 210.

In this regard, the fall back trajectory may actually include the vehicle pulling over to a safe position and stopping the vehicle. This fall back trajectory may therefore extend some nominal distance into the future, such as 20 seconds or more or less. As an example, a fall back trajectory may include the vehicle pulling over and coming to a stop within about 7 seconds when the vehicle is traveling at 25 miles per hour. This would correspond to approximately how long it would take the vehicle to achieve this. As shown in example 900 of FIG. 9, fall back trajectory 910 (show in dashed line) would enable the vehicle to pull over and stop within 5 seconds given vehicle 100's current speed.

As noted above, the computing system 110 may also generate the nominal trajectory that moves the vehicle towards the mission goal. Nominal trajectory 920 (show in dashed line) enables the vehicle to continue along rail 250 towards the destination. For clarity, separate views of both fall back trajectory 910 and nominal trajectory 920 are depicted example 1000 of FIG. 10.

Figure 9:
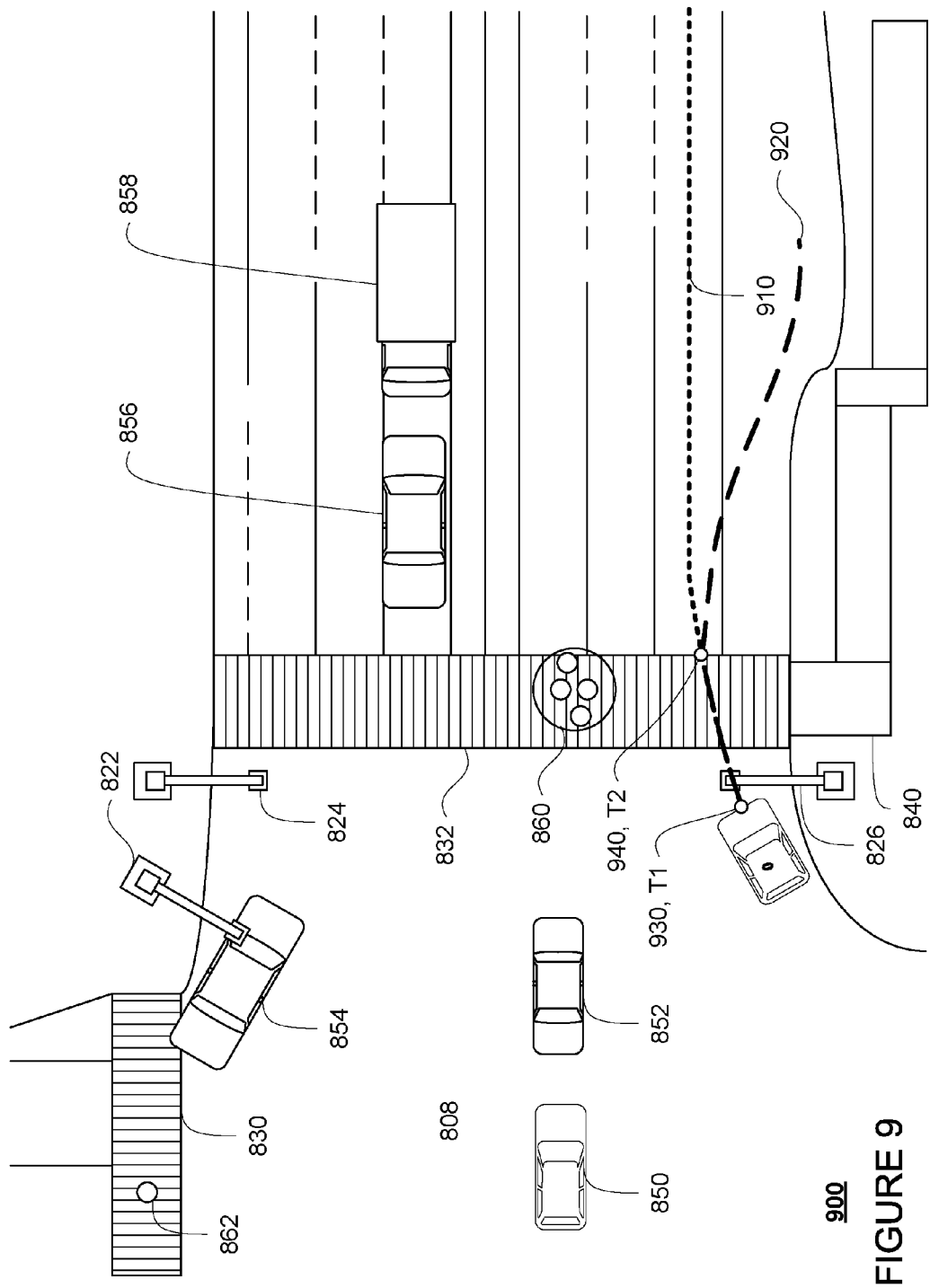
FIG. 9 is another example bird's eye view of an intersection with representations of primary and secondary trajectories in accordance with aspects of the disclosure.
Figure 10:
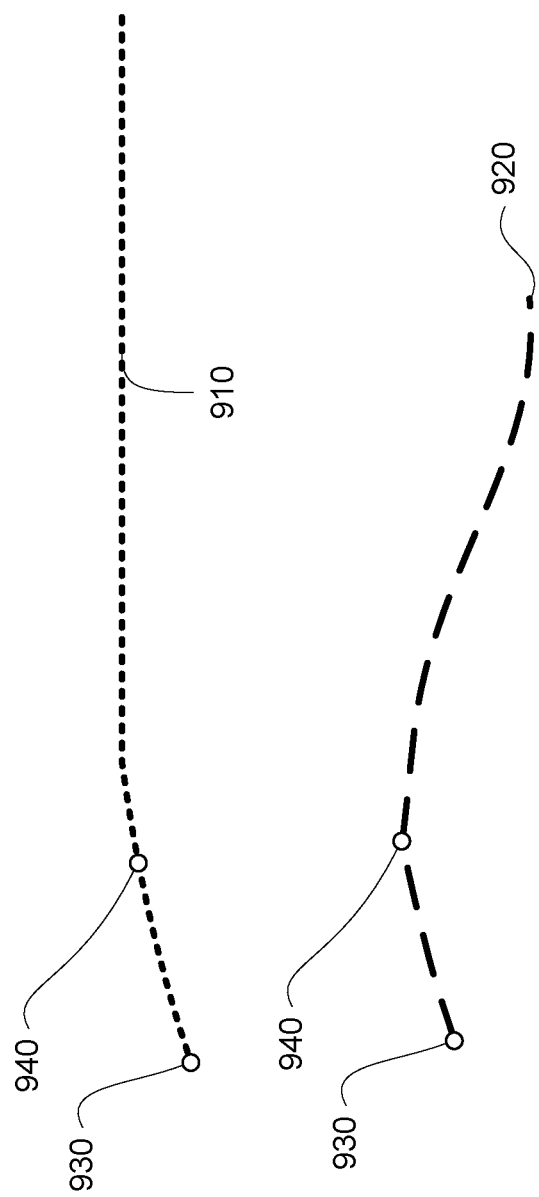
FIG. 10 is another view of the primary and secondary trajectories of FIG. 9 in accordance with aspects of the disclosure.

For some brief period, the fall back and the nominal trajectory may be identical. For example, as can be seen in FIGS. 9 and 10, the fall back trajectory 910 and nominal trajectory 920 overlap one another and are identical between points 930 and 940. In this example, points 930 and 940 represent locations to be reached by the vehicle at specific times. Thus, for both trajectory 910 and 920, the vehicle would be at point 930 (really a starting point of both trajectories 910 and 920) at a time T1. Similarly, following either trajectory, the vehicle 100 would reach point 930 at time T2. Accordingly, in addition to having the same trajectory, these overlapping portions (between points 930 and 940), may be associated with identical corresponding instructions. In other words, in addition to the physical locations of the vehicle to be reached at different times, the instructions to control acceleration, deceleration, steering, etc. may be the same for both trajectories between points 930 and 940.

After this brief period of overlap, the fall back and nominal trajectories may quickly diverge from one another. As an example, the brief period may be on the order of a few hundred milliseconds, or for example, 0.3 seconds. In this regard, after point 940, trajectory 910 would take the vehicle 100 off of the roadway, onto a shoulder area, and slowing down to a stop. In contrast, trajectory 920 would have the vehicle continuing along rail 250 towards the destination.

The brief period of overlap may be selected based upon when the computing system 210 would expect to receive an update from the computing system 110 and also how quickly the vehicle can actually make a real change to its heading or speed. For example, where the computing system 110 may send trajectories to the computing system 210 approximately 10 times per second (or every 0.1 seconds), the nominal and fall back trajectories should correspond for at least this long or even double this amount of time. By doing so, the computing system 210 may control the vehicle according to the nominal trajectory and corresponding instructions until at least some amount of time has passed where the computing system 210 would expect to receive an updated trajectory from the computing system 110. As noted above, this may include communicating with the deceleration system 160, acceleration system 162, steering system 164, signaling system 166 (for controlling turn signals), and power system 174 in order to control the movement, speed, etc. of vehicle 100 in accordance with the instructions 234 of memory 230 as well as the corresponding instructions. When an updated trajectory is received, the computing system 210 would then control the vehicle according to the updated trajectory and corresponding instructions until a new updated trajectory and corresponding instructions are received, and so on until the mission goal is achieved.

However, when the computing system 210 has not received an updated trajectory after the vehicle has reached a particular point along the fall back trajectory (for example in time or space), the computing system 210 would continue to control the vehicle according to the fall back trajectory. This threshold point may be determined by measuring a predetermined threshold period of time from the time when the fall back trajectory was received by the computing system 210. Similarly, the threshold point may be determined by measuring a predetermined threshold distance from the location of the vehicle when the fall back trajectory was received by the computing system 210. The threshold point may also correspond to a point in time or space on the fall back trajectory where it would begin to diverge from the nominal trajectory, or, in the example 900 of FIG. 9, at point 940.

In some examples, the threshold point may be determined dynamically by the computing systems 110 and/or 210, for instance, based on the vehicle's speed or steering angle. For instance, the threshold point may occur sooner when the vehicle is driving straight as opposed to when the vehicle is turning its wheels in the direction of where the vehicle would need to stop according to the fall back trajectory. Similarly, the threshold point may occur sooner when the vehicle is driving at 20 miles per hour than if the vehicle were traveling at 5 miles per hour as it would take less time to stop the vehicle at 5 miles per hour. Of course, the threshold point may thus be dependent not only on the vehicle's speed and steering angle, but also the characteristics of the roadway as identified from the detailed map information or sensor data from the perception system.

Of course, threshold point may also correspond to a point (in time or space) on the fall back trajectory that is after the point of divergence between the fall back and nominal trajectories. In this regard, the computing system 210 may tolerate a small amount of divergence between the trajectories and still return to the primary trajectory when an updated trajectory is received. However, after a significant amount of divergence, it could be unsafe to return to the primary trajectory (or a new updated fall back trajectory).

Because only the fall back trajectory is received by the computing device 210 (as opposed to both the fall back trajectory and the nominal trajectory, even when the computing system 110 has failed, the computing system 210 would not need to switch to a new trajectory and new corresponding instructions, but would simply continue controlling the vehicle using the last received fall back trajectory and corresponding instructions as discussed above. As this trajectory is a fall back trajectory, the computing system 210 would therefore maneuver the vehicle to stop safely.

In addition, after this threshold period of time has passed, if an update is received (i.e. the updated is received late), the secondary computing system can be configured not to trust this updated trajectory and simply ignore it. This prevents the secondary computing system from acting on bad data received from a failing primary computing system.

In some examples, the secondary computing system may include a rudimentary perception system. This perception system may include one of the sensors of the primary computing system's perception system or a dedicated sensor for the secondary computing system. For instance, a forward-facing radar could be used to monitor objects directly in front of the vehicle. However, to keep the secondary computing system as simple as possible, this sensor may simply be used by the vehicle simply as a last resort option to apply the brakes as much as possible where an object is detected within a certain distance of the vehicle. However, in order to avoid this action when not necessary, the sensor may be configured to filter many different types of objects, for example, based on distance and speed of the object and/or vehicle.

Figure 11:
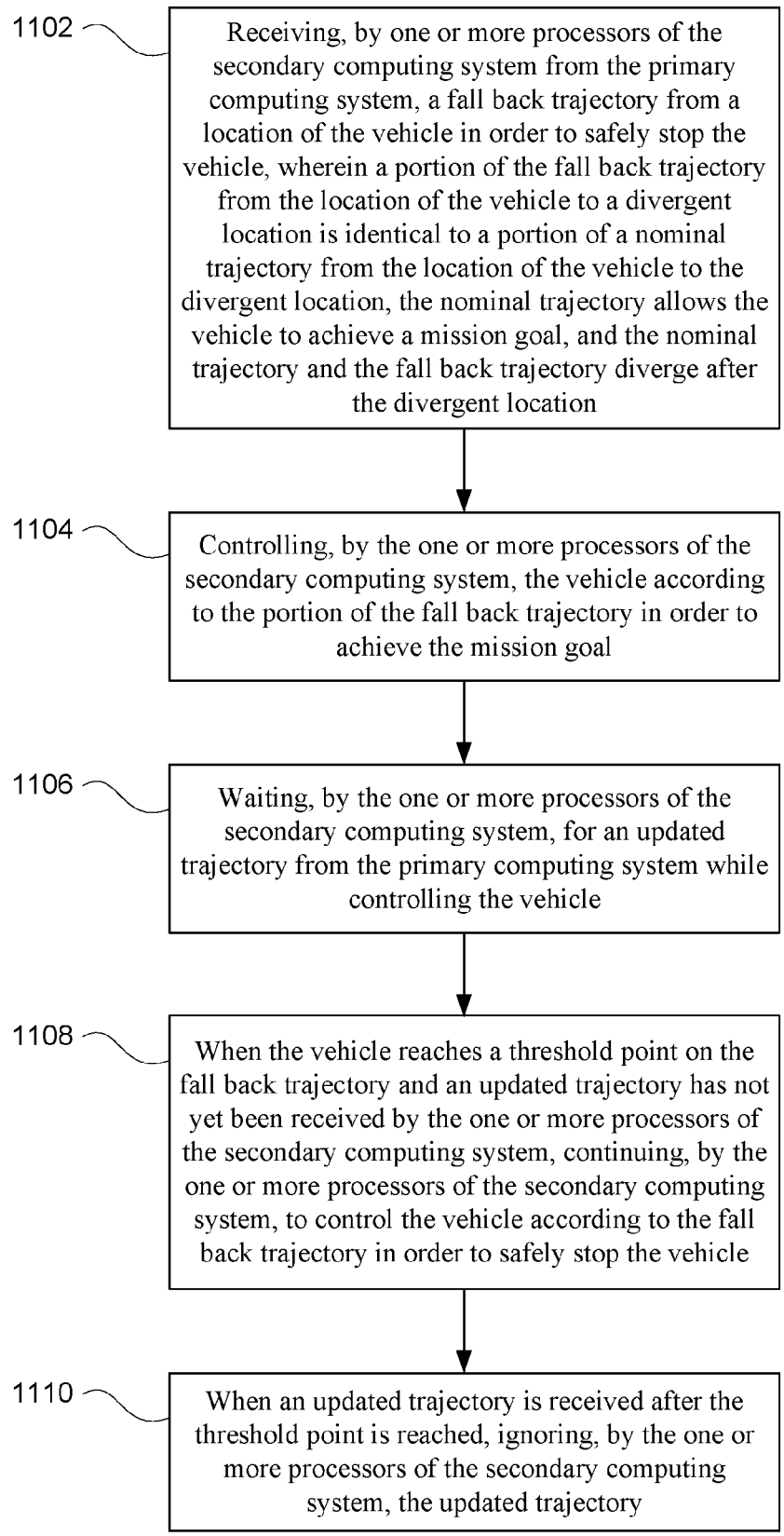
FIG. 11 is an example flow diagram in accordance with aspects of the disclosure.

FIG. 11 is an example flow diagram 1100 of various of the aspects described above which may be performed by one or more processors of a secondary computing system such as computing system 210. In this example, at block 1102, a fall back trajectory from a location of the vehicle in order to safely stop the vehicle is received by the one or more processors of the secondary computing system. A portion of the fall back trajectory from the location of the vehicle to a divergent location is identical to a portion of a nominal trajectory from the location of the vehicle to the divergent location. The nominal trajectory allows the vehicle to achieve a mission goal, and the nominal trajectory and the fall back trajectory diverge after the divergent location. At block 1104, the vehicle is controlled by the one or more processors of the secondary computing system, according to the portion of the fall back trajectory in order to achieve the mission goal. The one or more processors of the secondary computing system wait for an updated trajectory from the primary computing system while controlling the vehicle at block 1106. When the vehicle reaches a threshold point on the fall back trajectory and an updated trajectory has not yet been received by the one or more processors of the secondary computing system, the one or more processors of the secondary computing system continue to control the vehicle according to the fall back trajectory in order to safely stop the vehicle at block 1108. At block 1110, when an updated trajectory is received after the threshold point is reached, the one or more processors of the secondary computing system, ignore the updated trajectory.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of

The invention claimed is:

1. A method of controlling a vehicle, the method comprising:
generating, by a primary computing system, a nominal trajectory from a location for a vehicle in order to achieve a mission goal, the nominal trajectory being generated based on information received by the primary computing system from a perception system of the vehicle configured to detect objects in the vehicle's external environment;
generating, by the primary computing system, a fall back trajectory from the location for the vehicle in order to safely stop the vehicle, the fall back trajectory being generated based on the information received by the primary computing system from the perception system of the vehicle, wherein the nominal trajectory and the fall back trajectory are identical between the location and a divergent point and where the nominal trajectory and the fall back trajectory diverge after the divergent point;
sending, by the primary computing system, the fall back trajectory to a secondary computing system;
receiving, by the secondary computing system, the fall back trajectory; controlling, by the secondary computing system, the vehicle according to the fall back trajectory;
waiting, by the secondary computing system, for an updated trajectory from the primary computing system while controlling the vehicle according to the fall back trajectory; and
when the vehicle reaches a threshold point on the fall back trajectory and an updated trajectory has not yet been received by the secondary computing system, continuing to control the vehicle, by the secondary computing system, according to the fall back trajectory in order to safely stop the vehicle.

2. The method of claim 1, further comprising, when an updated trajectory is received after the threshold point is reached, ignoring, by the secondary computing system the updated trajectory.

3. The method of claim 1, further comprising:
receiving, by the secondary computing system, after the threshold point is reached, data from a sensor indicating that an object is detected by the sensor; and
in response to receiving the data from the sensor, applying, by the secondary computing system, the brakes of the vehicle in order to stop the vehicle immediately.

4. The method of claim 3, wherein the sensor is not part of the perception system and is a dedicated sensor of the secondary computing system.

5. The method of claim 1, wherein the divergent location corresponds to a time along the fall back trajectory during which the primary computing system should send an updated fall back trajectory during normal operation of the primary computing system.

6. The method of claim 1, further comprising:
prior to receiving the fall back trajectory, receiving, by the secondary computing system from the primary computing system, a first fall back trajectory having a first divergent location where the first fall back trajectory diverges from a first nominal trajectory generated by the primary computing system;
controlling, by the secondary computing system, the vehicle according to the first fall back trajectory; and
prior to reaching the first divergent location, receiving, by the secondary computing system the fall back trajectory as an updated trajectory.

7. The method of claim 6, further comprising replacing, by the secondary computing system, the nominal trajectory with the updated trajectory in order to control the vehicle according to the fall back trajectory.

8. The method of claim 1, wherein the threshold point corresponds to a physical location of the vehicle that is a predetermined threshold distance from the location of the vehicle when the fall back trajectory is received.

9. The method of claim 1, wherein the threshold point corresponds to a point in time that is a predetermined threshold amount of time from the time when the fall back trajectory is received by the secondary computing system.

10. The method of claim 1, wherein the threshold point corresponds to a point of divergence between the nominal trajectory and the fall back trajectory.

11. A system for controlling a vehicle, the system comprising:
a primary computing system having one or more processors configured to:
generate a nominal trajectory from a location for a vehicle in order to achieve a mission goal, the nominal trajectory being generated based on information received by the primary computing system from a perception system of the vehicle configured to detect objects in the vehicle's external environment,
generate a fall back trajectory from the location for the vehicle in order to safely stop the vehicle, the fall back trajectory begin generated based on the information received by the primary computing system from the perception system of the vehicle, wherein the nominal trajectory and the fall back trajectory are identical between the location and a divergent location and where the nominal trajectory and the fall back trajectory diverge after the divergent location, and
sending the fall back trajectory to a secondary computing system; and
the secondary computing system having one or more processors configured to:
receive the fall back trajectory;
control the vehicle according to the fall back trajectory;
wait for an updated trajectory from the primary computing system while controlling the vehicle; and
when the vehicle reaches a threshold point on the fall back trajectory and an updated trajectory has not yet been received by the secondary computing system, continue to control the vehicle according to the fall back trajectory in order to safely stop the vehicle.

12. The system of claim 11, wherein the one or more processors of the secondary computing system are further configured to, when an updated trajectory is received after the threshold point is reached, ignore the updated trajectory.

13. The system of claim 11, wherein the one or more processors of the secondary computing system are further configured to:
receiving after the threshold value is reached, data from a sensor indicating that an object is detected by the sensor; and in response to receiving the data from the sensor, applying the brakes of the vehicle in order to stop the vehicle immediately.

14. The system of claim 13, further comprising the sensor and wherein the sensor is not part of the perception system and is a dedicated sensor of the secondary computing system.

15. The system of claim 11, wherein the divergent location corresponds to a time along the fall back trajectory during which the primary computing system should send an updated fall back trajectory during normal operation of the primary computing system.

16. The system of claim 11, wherein the one or more processors of the secondary computing system are further configured to:
  prior to receiving the fall back trajectory, receive, from the primary computing system, a first fall back trajectory having a first divergent location where the first fall back trajectory diverges from a first nominal trajectory generated by the primary computing system;
  control the vehicle according to the first fall back trajectory; and
  prior to reaching the first divergent location, receive the fall back trajectory as an updated trajectory.

17. The system of claim 16, wherein the one or more processors of the secondary computing system are further configured to replace the nominal trajectory with the updated trajectory in order to control the vehicle according to the fall back trajectory.

18. The system of claim 11, further comprising the vehicle and the perception system.

19. A method comprising:
  receiving, by one or more processors of the secondary computing system from the primary computing system, a fall back trajectory from a location of the vehicle in order to safely stop the vehicle, wherein a portion of the fall back trajectory from the location of the vehicle to a divergent location is identical to a portion of a nominal trajectory from the location of the vehicle to the divergent location, the nominal trajectory allows the vehicle to achieve a mission goal, and the nominal trajectory and the fall back trajectory diverge after the divergent location;
  controlling, by the one or more processors of the secondary computing system, the vehicle according to the portion of the fall back trajectory in order to achieve the mission goal;
  waiting, by the one or more processors of the secondary computing system, for an updated trajectory from the primary computing system while controlling the vehicle; and
  when the vehicle reaches a threshold point on the fall back trajectory and an updated trajectory has not yet been received by the one or more processors of the secondary computing system, continuing, by the one or more processors of the secondary computing system, to control the vehicle according to the fall back trajectory in order to safely stop the vehicle.

20. The method of claim 19, further comprising when an updated trajectory is received after the threshold point is reached, ignoring, by the one or more processors of the secondary computing system, the updated trajectory.

* * * * *

UNITED STATES PATENT AND TRADEMARK OFFICE
CERTIFICATE OF CORRECTION

PATENT NO. : 9,551,992 B1
APPLICATION NO. : 14/991150
DATED : January 24, 2017
INVENTOR(S) : Andrew Barton-Sweeney, Daniel Trawick Egnor and Nathaniel Fairfield Page 1 of 1

It is certified that error appears in the above-identified patent and that said Letters Patent is hereby corrected as shown below:

On the Title Page

Under (57) Abstract, replace:
"Aspects of the disclosure provide systems and methods for providing suggested locations for pick up and destination locations. Pick up locations may include locations where an autonomous vehicle can pick up a passenger, while destination locations may include locations where the vehicle can wait for an additional passenger, stop and wait for a passenger to perform some task and return to the vehicle, or for the vehicle to drop off a passenger. As such, a request for a vehicle may be received from a client computing device. The request may identify a first location. A set of one or more suggested locations may be selected by comparing the predetermined locations to the first location. The set may be provided to the client computing device."

With:
--A method for controlling a vehicle includes generating, by a primary computing system, a nominal trajectory in order to achieve a mission goal and a fall back trajectory from the location in order to safely stop the vehicle. The nominal and the fall back are identical between the location and a divergent point and where the nominal and the fall back diverge after the divergent point. The fall back is sent to and received by a secondary computing system. The secondary computing system waits for an updated trajectory from the primary computing system while controlling the vehicle according to the fall back. When the vehicle reaches a threshold point on the fall back and an updated trajectory has not yet been received by the secondary computing system, the secondary computing system continues to control the vehicle according to the fall back in order to safely stop the vehicle.--

Signed and Sealed this
Twenty-eighth Day of May, 2019

Andrei Iancu
*Director of the United States Patent and Trademark Office*